United States Patent
Kulkarni et al.

(10) Patent No.: US 10,255,608 B2
(45) Date of Patent: Apr. 9, 2019

(54) BID LANDSCAPE TOOL

(75) Inventors: Prasad V. Kulkarni, Bangalore (IN); Arun Ramanujapuram, Bangalore (IN); Sandeep Hejmadi, Mumbai (IN); Subrahmanyam Divakarla, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 2351 days.

(21) Appl. No.: 12/774,357

(22) Filed: May 5, 2010

(65) Prior Publication Data

US 2011/0276389 A1 Nov. 10, 2011

(51) Int. Cl.
*G06Q 30/00* (2012.01)
*G06Q 30/02* (2012.01)
*G06Q 30/08* (2012.01)

(52) U.S. Cl.
CPC ......... *G06Q 30/02* (2013.01); *G06Q 30/0243* (2013.01); *G06Q 30/0249* (2013.01); *G06Q 30/0275* (2013.01); *G06Q 30/08* (2013.01); *G06Q 30/0247* (2013.01)

(58) Field of Classification Search
CPC ........... G06Q 30/0275; G06Q 30/0247; G06Q 30/0243
USPC .......................................................... 705/14
See application file for complete search history.

(56) References Cited

U.S. PATENT DOCUMENTS

| 8,024,228 B1 * | 9/2011 | Schultz ........................ 705/26.3 |
| 2006/0026063 A1 * | 2/2006 | Collins ........................... 705/14 |
| 2007/0174118 A1 | 7/2007 | Dekel et al. | |
| 2011/0246302 A1 | 10/2011 | Kwon et al. | |

FOREIGN PATENT DOCUMENTS

WO  WO 2010/032928 A2  3/2010

OTHER PUBLICATIONS

Office Action issued in Korean Patent Application No. 10-2012-7027380 dated Dec. 5, 2014.
Office Action issued in Taiwanese Patent Application No. 100115723 dated Nov. 7, 2014.
Office Action issued in corresponding Japanese Patent Application No. 2013-509131 dated Dec. 24, 2013.
Office Action issued in Korean Patent Application No. 10-2012-7027380 dated Oct. 23, 2014.
Office Action issued in Canadian Patent Application No. 2,792,893 dated Oct. 24, 2014.

(Continued)

*Primary Examiner* — Mario C. Iosif
(74) *Attorney, Agent, or Firm* — Mauriel Kapouytian Woods LLP; Lana Akopyan; James Woods

(57) ABSTRACT

Techniques are provided that can be used in advertising campaign management in connection with auction-based online advertising. A tool is provided, for use by advertisers or advertising campaign managers, for being provided with, in connection with specified parameters, an indication of a competitive bid and a non-competitive bid. The tool may also provide an actual, estimated, or projected bid, which may be associated with an advertising campaign or a portion thereof, for comparison with the competitive bid and the non-competitive bid. The tool may allow assessment of a competitive bid landscape and help allow determination of an optimal bid.

20 Claims, 5 Drawing Sheets

(56) References Cited

OTHER PUBLICATIONS

Office Action issued in Korean Patent Application No. 10-2012-7027380 dated Mar. 31, 2014.
Office Action issued in Taiwanese Patent Application No. 100115723 dated Apr. 2, 2014.
Office Action issued in Chinese Patent Application No. 201180021574.1 dated May 9, 2017, 25 pages.
Office Action issued in Chinese Patent Application No. 201180021574.1, dated Nov. 6, 2017, 32 pages.
Reexamination Decision issued in Japanese Patent Application No. 201180021574.1 dated Nov. 6, 2017, 32 pages.

* cited by examiner

BID LANDSCAPE TOOL

BACKGROUND

Online advertisers and campaign managers (including their agents or proxies) are eager to efficiently and effectively manage their online advertising campaigns, including maximizing return on investment and achieving their particular campaign objectives. Often, online advertising systems utilize an auction-based format, in which advertiser bids are used in specifying an amount the advertiser is willing to pay, for example, for an amount of impressions, within certain parameters, during a specified period and using a specified budget. In addition to, for example, specifying the advertisement or type of advertisement, other parameters may be specified, such as a required context, keywords, rank, position, targeting attributes, etc.

The right bidding can be crucial to campaign effectiveness, return on investment, and achievement of campaign goals. For example, too low bidding can lead to campaign underperformance, underdelivery, and failure to reach campaign and return on investment goals. Yet, too high bidding can also be detrimental to campaign performance, leading to suboptimal return on investment and campaign performance. Furthermore, poor bidding also adversely affects other involved entities, such as publishers and marketplace providers, who also realize lower profit from poor advertiser campaign performance, may underdeliver on advertiser contracts, and may further suffer from lower advertiser spend and involvement resulting from advertiser dissatisfaction with online advertising campaign performance.

Advertisers and campaign managers are often keenly aware of their particular campaign goals, budget, and other key parameters that are very important to campaign management and bidding strategy. Yet, they may have insufficient information with which to determine the right or optimal bid amounts. They may need to employ a trial and error approach, observing the affects of too low and too high bidding before trying to arrive at a reasonable bid price point, meanwhile wasting valuable time and suffering from poor campaign performance and return on investment.

There is a need for techniques for providing advertisers and advertising campaign managers with information to help them determine or optimize bidding and bid amounts in auction-based online advertising.

SUMMARY

Some embodiments of the invention provide methods and systems that can be used in advertising campaign management in connection with auction-based online advertising. In some embodiments, a tool is provided, for use by advertisers or advertising campaign managers, for being provided with, in connection with specified parameters, an indication of a competitive bid and a non-competitive bid. The tool may also provide an actual, estimated, or projected bid, which may be associated with an advertising campaign, or a portion of the advertising campaign, for comparison with the competitive bid and the non-competitive bid.

A competitive bid and a non-competitive bid amount or range may be defined or determined in many different ways. For example, based on pertinent historical information, or projections, or both, a competitive bid amount may be determined as a bid falling at a certain percentage toward the higher end of a bid range, such as at or near the top 20th percentile, whereas a non-competitive bid amount may be determined as a bid falling at a certain percentage toward the lower end of a bid range, such as at or near the top 80th percentile.

In some embodiments, use of the tool, or repeated or adjusted use of the tool with different input parameters or suppositions, may allow efficient and convenient assessment of a competitive bid landscape and help provide advertisers or advertisement campaign managers with the information they lack and need to allow them to determine an optimal bid or bid range for optimized advertising campaign performance, campaign goal achievement or return on investment, for example.

While the invention is described with reference to the above drawings, the drawings are intended to be illustrative, and the invention contemplates other embodiments within the spirit of the invention.

DETAILED DESCRIPTION

Figure 1:
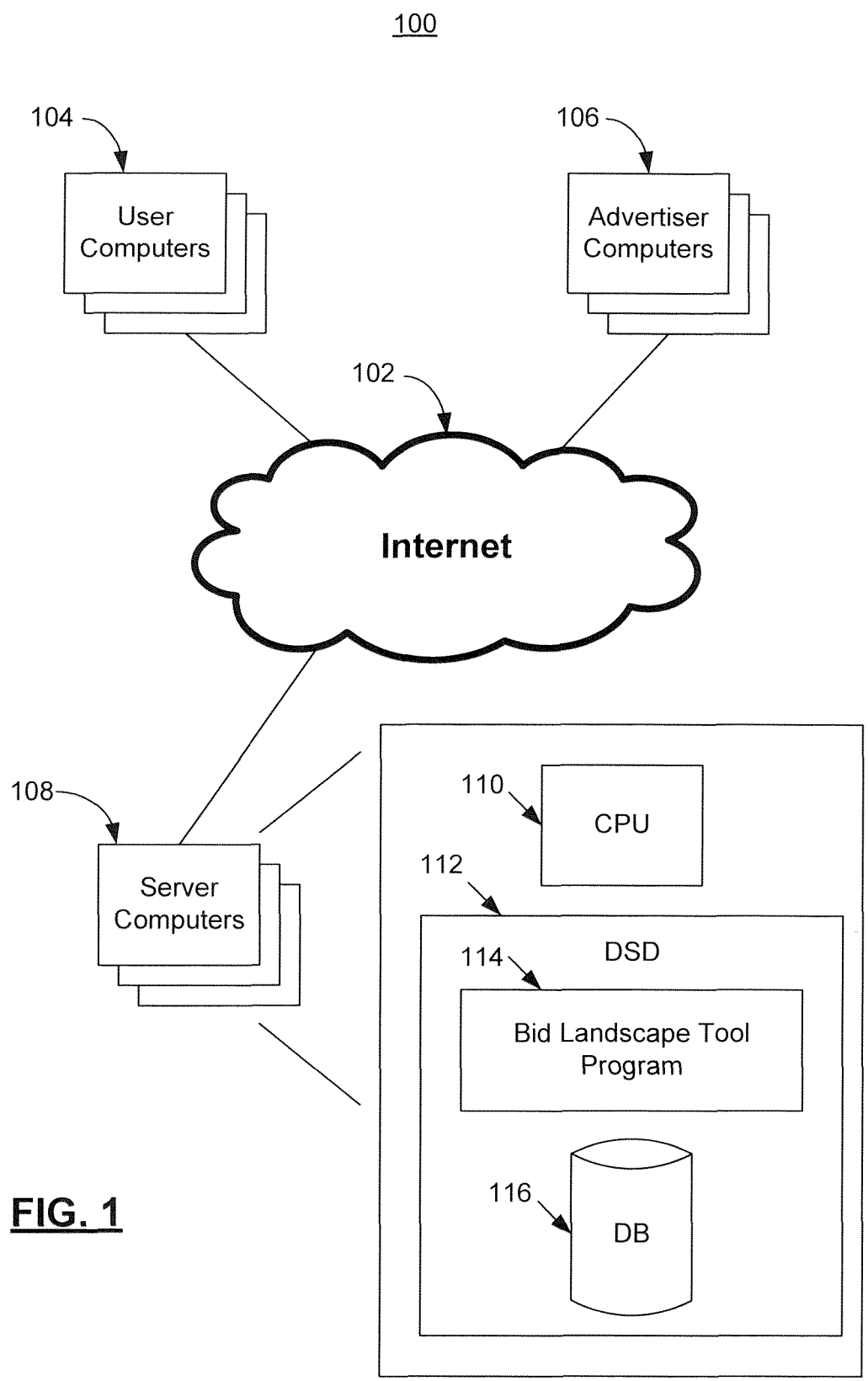
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Bid Landscape Tool Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
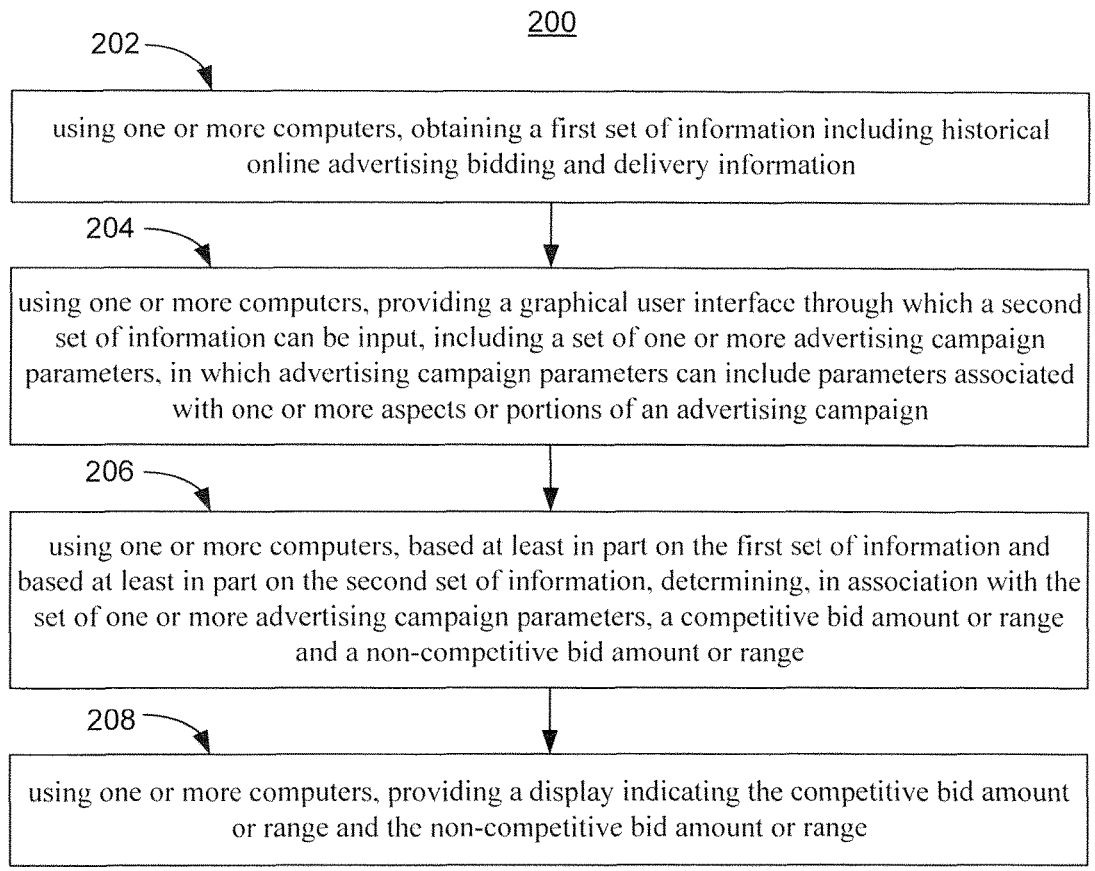
FIG. 2 is a flow diagram illustrating a method according to one embodiment of the invention.

FIG. 2 is a flow diagram illustrating a method 200 according to one embodiment of the invention.

At step 202, using one or more computers, a first set of information is obtained, including historical online advertising bidding and delivery information.

At step 204, using one or more computers, a graphical user interface is provided, through which a second set of information can be input, including a set of one or more advertising campaign parameters, in which advertising campaign parameters can include parameters associated with one or more aspects or portions of an advertising campaign.

At step 206, using one or more computers, based at least in part on the first set of information and based at least in part on the second set of information, determination is made of, in association with the set of one or more advertising campaign parameters, a competitive bid amount or range and a non-competitive bid amount or range.

At step 208, using one or more computers, a display is provided, indicating the competitive bid amount or range and the non-competitive bid amount or range.

Figure 3:
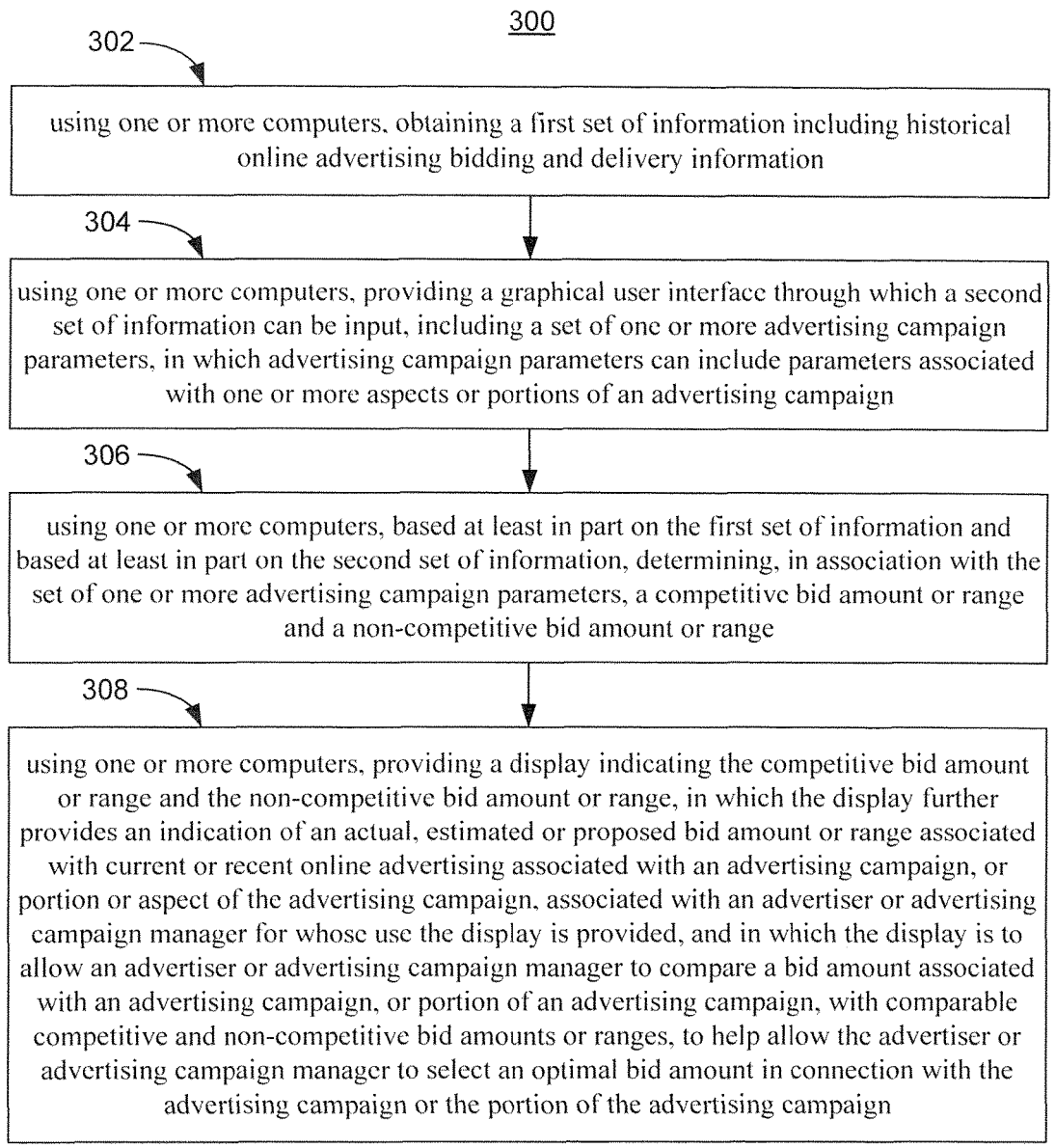
FIG. 3 is a flow diagram illustrating a method according to one embodiment of the invention.

FIG. 3 is a flow diagram illustrating a method 300 according to one embodiment of the invention. Steps 302, 304 and 306 of the method 300 depicted in FIG. 3 are similar to step 202, 206 and 208 of the method 200 depicted in FIG. 2.

At step 308, using one or more computers, a display is provided, indicating the competitive bid amount or range and the non-competitive bid amount or range. The display further provides an indication of an actual or estimated bid amount or range associated with current or recent online advertising associated with an advertising campaign, or portion or aspect of the advertising campaign, associated with an advertiser or advertising campaign manager for whose use the display is provided. The display is to allow an advertiser or advertising campaign manager to compare a bid amount associated with an advertising campaign, or portion of an advertising campaign, with comparable competitive and non-competitive bid amounts or ranges, to help allow the advertiser or advertising campaign manager to select an optimal bid amount in connection with the advertising campaign or the portion of the advertising campaign.

Figure 4:
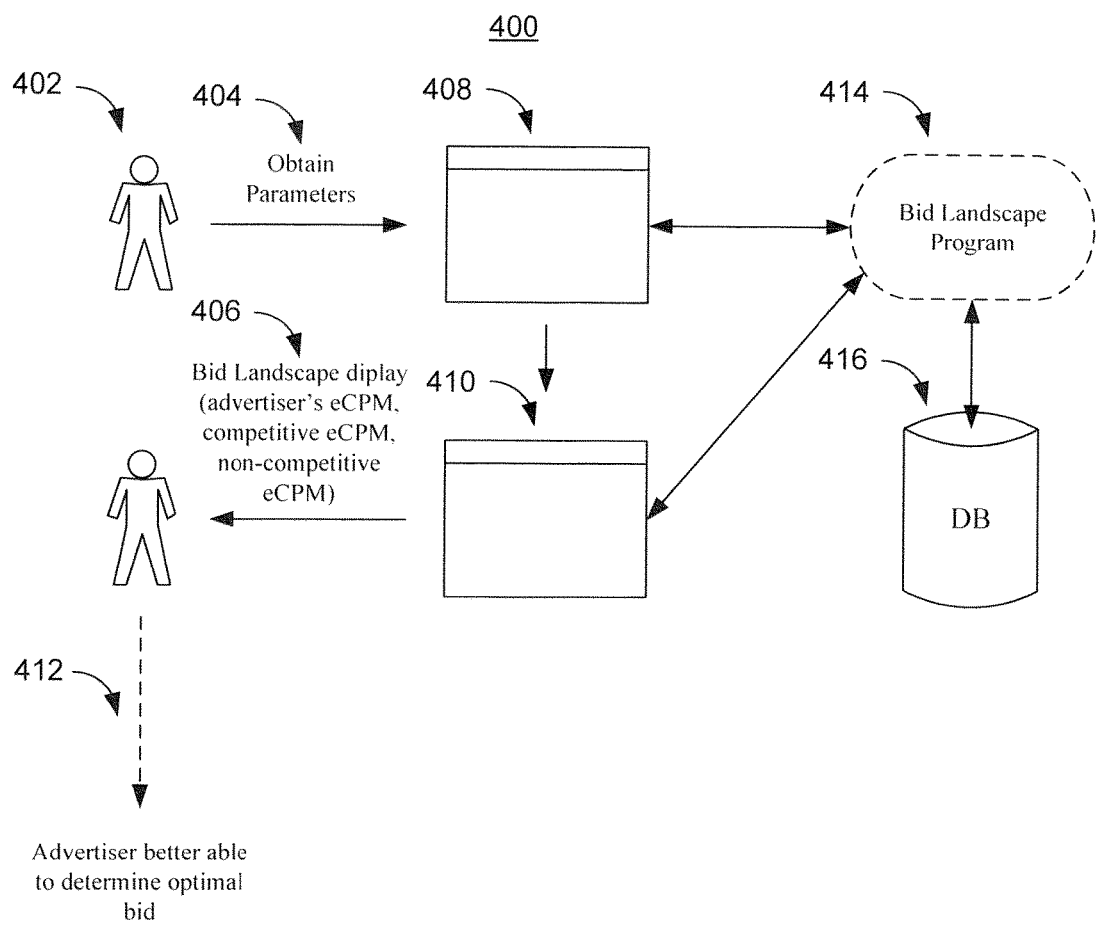
FIG. 4 is a block diagram illustrating one embodiment of the invention.

FIG. 4 is a block diagram 400 illustrating one embodiment of the invention. Block 402 represents an advertiser or advertisement campaign manager (which can include any agent or proxy thereof).

Arrow 404 represents obtaining of advertising or advertising campaign parameters from the advertiser or advertisement campaign manager 402 via a graphical user interface 408.

Following this, a display 410 is provided, for the use of the advertiser or advertisement campaign manager 402, which includes information relating to the bid landscape. Specifically, the display 410 includes an indication of effective cost per thousand impressions (eCPM) associated with an advertising campaign, or portion thereof, associated with the advertiser or advertisement campaign manager 402, as well as an indication of a competitive eCPM and a non-competitive eCPM.

After obtaining the parameter information, a bid landscape program 414 (which is broadly intended to include various programming, applications, etc., used to implement methods and techniques according to embodiments of the invention) facilitates providing the information and display described with regard to the graphical user interface 408 and the display 410. The bid landscape program 414 make use of information, including historical advertising and bidding related information, which may be stored in one or more databases, such as database 416.

As represented by arrow 412, the display 410 provides the advertiser or advertisement campaign manager 402 with information that is helpful to the advertiser or advertisement campaign manager 402 in selecting a good or optimal bid for a future period for the advertising campaign or portion of the advertising campaign.

In some embodiments, the indication of the eCPM associated with the advertisement campaign or portion of the advertisement campaign, along with the indication of a competitive and non-competitive bid, allows the advertiser or advertisement campaign manager 402 to get a "feel" for or better appreciate the bid landscape, including the advertiser's eCPM in comparison to the competitive bid and the non-competitive bid. The advertiser or advertising campaign manager 402 can then use this information in determining a good or optimal bid, such as for a future period of time in connection with the advertising campaign.

Some embodiments also include implementing bidding in accordance with a bid obtained from the advertiser or advertisement campaign manager 402.

Figure 5:
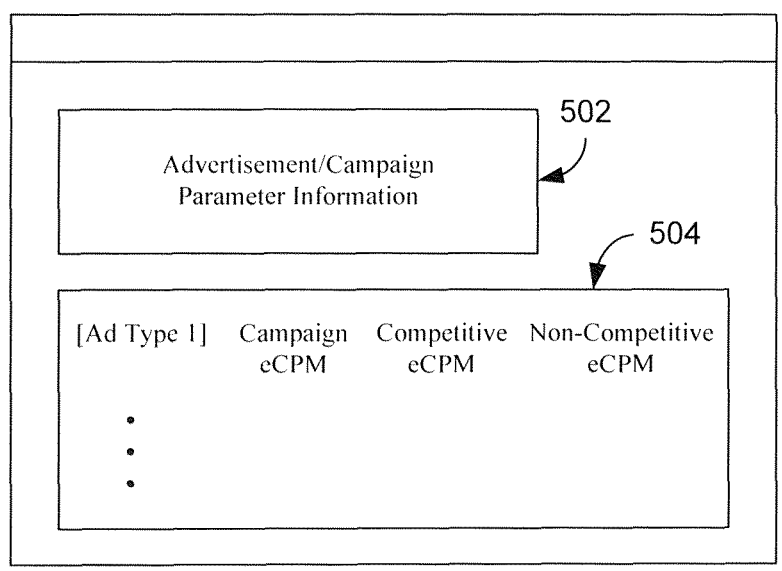
FIG. 5 a simplified graphical user interface according to one embodiment of the invention.

FIG. 5 is a simplified graphical user interface 500 illustrating one embodiment of the invention. An upper portion 502 includes advertisement or advertising campaign parameter information. A lower portion 504 includes bid landscape information, including, for each of a number of types or forms of advertisements, an eCPM (which indicates an associated bid) relating to an advertising campaign, or portion thereof, associated with an advertiser or advertising campaign manager, as well as a competitive eCPM and a non-competitive eCPM. Many other configurations and additional displayed information are of course possible. Furthermore, information organized by type of advertisement is merely one example of a possible configuration, and many other groups of landscape information, grouped by various other parameters, are of course possible.

In various embodiments, various types of additional parameter information may be provided by or selected by a user, or may be provided for or suggested for the user. As just few examples, such information could include the advertiser, the campaign, the area or type of advertiser, the performance basis of the campaign (such as cost per impression, cost per click, etc.), publisher category, advertisement size, etc.

Some embodiments of the invention provide a user interface tool, or application. The tool may provide a user-interface-based application that allows advertisers, account managers, or other advertising campaign managers, participating in online auction-based advertising marketplaces, to be provided with information to give them a sense of the competitiveness of a particular entered bid, or other possible bids, relating to online advertising or an online advertising contract. The tool gives an advertiser a sense of the bidding landscape, allowing the advertiser to make more informed or optimal bid amount decisions. In some embodiments, the advertiser enters a possible bid and a particular pricing arrangement (such as cost per impression, cost per click, or cost per acquisition). This may be converted to its equivalent in a standard measure, or a comparable quantity in a standard measure, such as eCPM. Additionally, in some embodiments, an example of a competitive eCPM as well as a non-competitive eCPM is provided. In some embodiments, the advertiser may proceed to use the tool repeatedly or make adjustments within a particular graphical user interface, trying different possibilities or parameters, to learn more about aspects of the bid landscape. In some embodiments, different types of advertisements, such as sizes of advertisements, or different placements or ranks of advertisements, may correspond with different metrics.

Some embodiments of the invention include recognition that advertisers and campaign managers (including their proxies or assistants, account managers, agents, representatives, etc.) have not generally had good visibility into various aspects of bid landscapes, and the results of various bids, such as in connection with an auction-based advertising marketplace or exchange. Often, they have had to go through a trial an error process with bidding, resulting in wasted time as well as poor campaign performance and return on investment. Some embodiments of the invention address this by providing a bid landscape tool, or bid calculator. In some embodiments, advertisers can enter a proposed or possible bid, and perhaps other parameter information, such as particular campaign goals, and the tool provides a sense of the competitiveness of the bid, such as by providing an example of a competitive bid and a non-competitive bid, so that the proposed bid (or corresponding eCPM) can be put into the competitive bidding context, better allowing selection of an optimal or competitive actual bid.

For example, in some embodiments, a tool is provided that takes into account historical information from, for example, the past thirty advertisement delivery days, including detecting trends for various parameters for an advertiser (such as the advertisers subject matter or market area, such as Ford automobiles) or a vertical category (for example, automobiles). In some embodiments, the information is looked at an advertisement position or ranking level for the respective advertiser or vertical category. In some embodiments, the information is processed with regard to clickthroughs, impression volume consumed and campaign goal delivered historically at a particular position level or rank. In some embodiments, the current budget allocation is also analyzed, such as at an advertisement position or rank level basis. In some embodiments, various bidding and performance parameters, such as click through rates, acquisition rates, conversion rates, etc., are converted to eCPM. In some embodiments, a user can use the tool to determine, for instance, whether a particular bidding strategy will deliver on specified campaign performance goals.

In some embodiments, this information is then extrapolated to the current spend allocated by the advertiser and an estimate volume of impressions to be consumed is arrived at. In some embodiments, the tool also analyzes campaign goals delivered historically for the respective advertiser and/or vertical category, and predicts the budget consumption pattern at a position level, for instance. With projected impressions and budget consumption, the average eCPM is determined, which may represent the current bid rate for the advertiser. Historical data for the advertiser and/or vertical category is also analyzed, and a competitive bid and a non-competitive bid may be determined, such as, for example, respectively, a top 20% bid and a top 80% bid. The user can compare the output of the eCPM bid for the user's current campaign with the competitive and non-competitive bids, obtaining a sense of the bid landscape. The user can then increase or decrease bid price-point to optimize return on investment, for example. In some embodiments, machine learning-based techniques and models may be used in various analyses and determinations, including in determining competitive and non-competitive bids from historical information. In some embodiments, the tool is applicable to various forms and agreements relating to online advertising, including cost per click-based and cost per acquisition-based campaigns.

While the invention is described with reference to the above drawings, the drawings are intended to be illustrative, and the invention contemplates other embodiments within the spirit of the invention.

The invention claimed is:

1. A method for use in connection with auction-based online advertising, comprising:
   obtaining a first set of information comprising historical online advertising bidding and delivery information;
   receiving input from a graphical user interface including a second set of information, including a set of one or more advertising campaign parameters, wherein advertising campaign parameters can include parameters associated with one or more aspects or portions of an advertising campaign;
   based at least in part on the first set of information and based at least in part on the second set of information, determining, in association with the set of one or more advertising campaign parameters, a competitive bid amount or range and a non-competitive bid amount or range;
   displaying a bid landscape graphical user interface including a user selectable parameter positioned in the upper portion of the interface and indications of the competitive bid amount or range and the non-competitive bid amount or range organized by the user selectable parameter wherein the indications are provided for each of a number of types or forms of the user selectable parameter and providing for capability for the user repeatedly making adjustments and trying different possibilities for parameters; and
   implementing bidding according to selection of a bid amount from the displayed bid landscape graphical user interface and based on conversion of the bid amount into its equivalent in a standard measure.

2. The method of claim 1, comprising further providing, via the display, an indication of an actual, estimated, or proposed bid amount or range associated with current or recent online advertising associated with an advertising campaign, or portion or aspect of the advertising campaign, associated with an advertiser or advertising campaign manager for whose use the display is provided.

3. The method of claim 1, comprising allowing a user to input a possible, proposed or hypothetical bid, and to be provided with an indication of a competitive bid and a non-competitive bid relative to the possible, proposed or hypothetical bid.

4. The method of claim 1, comprising allowing an advertiser or advertising campaign manager to compare a bid amount associated with an advertising campaign, or portion of an advertising campaign, with comparable competitive and non-competitive bid amounts, to help allow the advertiser or advertising campaign manager to select an optimal bid amount.

5. The method of claim 2, wherein obtaining the first set of information comprises obtaining historical information over a recent period of time in connection with a vertical market associated with the advertising campaign, or the portion or the advertising campaign.

6. The method of claim 2, comprising determining projected impressions information and projected budget consumption information relating to the advertising campaign, or the portion or the advertising campaign, and comprising utilizing the projection impressions information and the projected budget consumption information in determining the actual or estimated bid amount or range associated with recent online advertising associated with an advertising campaign.

7. The method of claim 1, wherein the set of one or more advertising campaign parameters comprises one or more advertising campaign goals.

8. The method of claim 1, comprising obtaining a first set of information comprising historical online advertising performance information.

9. The method of claim 1, comprising determining, in association with the set of one or more advertising campaign parameters, a competitive bid amount or range and a non-competitive bid amount or range, wherein the competitive bid amount or range and the non-competitive bid amount or range are determined based on a percentile or percentile-equivalent ranking relative to bidding and advertising associated with a plurality of advertising campaigns.

10. The method of claim 1, comprising determining, in association with the set of one or more advertising campaign parameters, a competitive bid amount or range and a non-competitive bid amount or range, wherein the competitive bid amount or range and the non-competitive bid amount or rang are determined based on a percentile or percentile-equivalent ranking relative to bidding and advertising associated with a plurality of advertising campaigns, and wherein the competitive bid amount or range is determined to be at or near a top 20th percentile, and the non-competitive bid amount or range is determined to be at or near a top 80th percentile.

11. The method of claim 1, wherein bid amounts or ranges are specified in terms of effective cost per thousand impressions (eCPM).

12. The method of claim 1, comprising a graphical user interface through which a second set of information can be input, including a set of one or more advertising campaign parameters, wherein the one or more advertising campaign parameters include one or more parameters indicating information relating to a type or form of advertisement and one or more parameters indicating information relating to a subject matter-based area.

13. The method of claim 2, wherein the advertising campaign, or the portion of the advertising campaign, is impression-based, click-based, or acquisition-based.

14. The method of claim 1, wherein providing a graphical user interface comprises providing a Web-based graphical user interface.

15. The method of claim 1, wherein determining, in association with the set of one or more advertising campaign parameters, a competitive bid amount or range and a non-competitive bid amount or range comprises determining projected or actual historical bid amounts or ranges.

16. The method of claim 1, wherein determining, in association with the set of one or more advertising campaign parameters, a competitive bid amount or range and a non-competitive bid amount or range comprises utilizing at least one machine learning-based method.

17. A system comprising:
one or more server computers coupled to a network; and
one or more databases coupled to the one or more server computers;
wherein the one or more server computers are for:
obtaining a first set of information comprising historical online advertising bidding and delivery information;
receiving input from a graphical user interface including a second set of information, including a set of one or more advertising campaign parameters, wherein advertising campaign parameters can include parameters associated with one or more aspects or portions of an advertising campaign;
based at least in part on the first set of information and based at least in part on the second set of information, determining, in association with the set of one or more advertising campaign parameters, a competitive bid amount or range and a non-competitive bid amount or range;
displaying a bid landscape graphical user interface including a user selectable parameter positioned in the upper portion of the interface and indications of the competitive bid amount or range and a non-competitive bid amount or range organized by the user selectable parameter wherein the indications are provided for each of a number of types or forms of the user selectable parameter and providing for capability for the user repeatedly making adjustments and trying different possibilities for parameters; and
implementing bidding according to selection of a bid amount from the displayed bid landscape graphical user interface and based on conversion of the bid amount into its equivalent in a standard measure.

18. The system of claim 17, wherein the one or more server computers are coupled to the Internet.

19. The system of claim 17, comprising further providing, via the display, an indication of an actual, estimated or proposed bid amount or range associated with current or recent online advertising associated with an advertising campaign, or portion or aspect of the advertising campaign, associated with an advertiser or advertising campaign manager for whose use the display is provided.

20. A non-transitory computer readable medium or media containing instructions for executing a method comprising:
obtaining a first set of information comprising historical online advertising bidding and delivery information;
receiving input from a graphical user interface including, including a set of one or more advertising campaign parameters, wherein advertising campaign parameters can include parameters associated with one or more aspects or portions of an advertising campaign;
based at least in part on the first set of information and based at least in part on the second set of information, determining, in association with the set of one or more advertising campaign parameters, at least one bid amount or range anticipated to be competitive, and at least one bid amount or range anticipated to be non-competitive;
displaying a bid landscape graphical user interface including a user selectable parameter positioned in the upper portion of the interface and indications of the at least one bid amount or range anticipated to be competitive and the at least one bid amount or range anticipated to be non-competitive organized by the user selectable parameter wherein the indications are provided for each of a number of types or forms of the user selectable parameter and providing for capability for the user repeatedly making adjustments and trying different possibilities for parameters; and
implementing bidding according to selection of a bid amount from the displayed bid landscape graphical user interface and based on conversion of the bid amount into its equivalent in a standard measure;

wherein the display further provides an indication of an actual, estimated or proposed bid amount or range associated with current or recent online advertising associated with an advertising campaign, or portion or aspect of the advertising campaign, associated with an advertiser or advertising campaign manager for whose use the display is provided; and wherein the display is to allow an advertiser or advertising campaign manager to compare a bid amount associated with an advertising campaign, or portion of an advertising campaign, with comparable competitive and non-competitive bid amounts or ranges, to help allow the advertiser or advertising campaign manager to select an optimal bid amount in connection with the advertising campaign or the portion of the advertising campaign.

* * * * *